Nov. 13, 1951 — A. TALALAY — 2,574,849
RESILIENT COMPRESSIBLE FIBROUS PRODUCT
Filed Aug. 8, 1947 — 3 Sheets-Sheet 1

INVENTOR
Anselm Talalay
BY
ATTORNEY

Nov. 13, 1951 A. TALALAY 2,574,849
RESILIENT COMPRESSIBLE FIBROUS PRODUCT
Filed Aug. 8, 1947 3 Sheets-Sheet 2

INVENTOR
Anselm Talalay
BY
ATTORNEY

Patented Nov. 13, 1951

2,574,849

UNITED STATES PATENT OFFICE 2,574,849

RESILIENT COMPRESSIBLE FIBROUS PRODUCT

Anselm Talalay, New Haven, Conn., assignor to The Sponge Rubber Products Company, Shelton, Conn., a corporation of Connecticut Application August 8, 1947, Serial No. 767,458

10 Claims. (Cl. 117—140)

1

This invention relates to resilient compressible filamentous space filling materials of open texture. The materials herein particularly concerned comprise a stereoreticulate entanglement of filaments fastened to one another at random spaced points where they cross or are juxtapositioned for preserving the open texture or intersticed characteristic of the material throughout a mass thereof and for better empowering the mass to maintain or restore itself to an original overall size and shape by inhibiting bunching or compacting of the filaments in any part of the entanglement when the material is subjected in service to such outside forces as compression or vibration or movement of liquids or gas through same. Resilient materials having such an open texture find many uses such as in upholstery padding, cushioning supports, vibration absorption, soundproofing, heat insulation, liquid absorption, liquid or gas filtering, and carpet underlays. Such materials may be employed in furniture, clothing, mechanical apparatus and as packing in shipping and storage containers.

One object of the present invention is to produce a material of this class which more successfully than heretofore can withstand compressive forces, vibration and other outside forceful disturbance without undergoing permanent change or impairment that will objectionably alter the original overall shape or size of a given mass of the material.

A further object is to fabricate a conglomerate of coarse strong filaments, which I may term upholstery fibers, so intermingled with and bonded to a fleece of much finer filaments contrasting greatly with said fibers in thickness and strength which I may term textile fibrils, that a space filling material results whose performance and endurance in the aforementioned respects is greatly improved.

A further object is to obtain a cooperative reaction between the contrasting physical characteristics of such upholstery fibers and such fleece of textile fibrils thus bonded together that will make use of the greater bending resistance and resilient strength of the individual upholstery fibers by arranging them so as to constitute an unwoven, unfelted skeleton framework sustaining and adding stamina to the fleece of much weaker textile fibrils, and that will make use of the greater flexibility, stretchability and comparative resilient weakness of the fleece of textile fibrils by arranging the latter so as to constitute an unwoven, unfelted compressible padding or cushioning filling for the spaces between the much

2 stronger fibers of said framework thus bolstering and adding stamina to the latter.

A further object is to make as wide use as possible of the cheaper and more available types of relatively weak filaments in the finer and cheaper range of sizes, or textile counts, in a bonded entanglement going to make up a space filling material that is suitable for upholstery or other resilient cushioning purposes, whereas it has heretofore been assumed that only strongly resilient fibers in the scarce and costly range of sizes or upholstery counts such as curled hog hair or curled cattle tail hair could satisfactorily serve this purpose.

A further object is to produce a pressure withstanding, strongly resilient mass of space filling material including a copious fleece of commingled fine filaments coated and bonded together, in which mass the interstices between juxtapositional fibrils are of such uniform minuteness that intense and widespread capillary action is exerted throughout the mass upon any liquid attempting to pass through the interstices of the material so that a large volume of such liquid may be attracted into and retained within such tiny interstices. The individual filaments may be of nonabsorbent nature or they may be rendered nonabsorbent or repellent to specific liquids by their coating of bonding substance while at the same time being absorbent to other kinds of liquids.

The spreading, drying and vulcanizing of liquid latex through a widely open skeleton framework or entanglement of coarse curled animal hairs or the like applied as a coating for such hairs, has been proposed in attempts to produce an improved space filling material for upholstery padding. It has been found however when attempt is made to practice this method with considerably finer sizes or counts of filaments that these fine weak filaments do not have the necessary resilient and clinging strength to withstand the disruptive forces which unavoidably are brought to bear on them in any known ways of disturbing a liquid adhesive such as latex throughout a loose entanglement of dry filaments of such fine sizes.

For purposes of reference hereinafter I shall use the term fibrils, or filaments in the range of textile counts, to designate the thinner weaker sizes of filaments ranging, say, up to approximately 40 deniers, such as the fibrils in cotton batting, kapok, and some of the present day readily available single strand filaments of rayon. Textile filaments as defined above, however long they may be, are too light or weak in cross section to stand up against known methods of introducing a bonding substance throughout a loosely entangled mass thereof and they yield or mat into a compacted form which reduces or destroys the spaces between them. For example, forcibly spraying a loose entanglement or fleece of dry filaments of the slender weak textile range of gauges, or dragging such loose entanglement through or submerging it in a bath of liquid adhesive, causes the fine filaments to bed down so that much or all of the desired porosity of the original texture is lost and the resulting material becomes objectionably dense. For these and other reasons, proposals to sparsely coat very loosely associated dry filaments with an adhesive liquid or agglutinant have been confined to the thicker and stronger class of filaments or curled springy upholstery fibers that are heavier in cross section ranging say from approximately 75 deniers upward which sizes are in the range of upholstery counts. Heretofore, no very finely intersticed open texture, such as a skeleton network consisting solely or mainly of fibrils which are of the slender weak textile counts, has been successfully impregnated with a liquid adhesive in a manner to retain the open texture so far as I am informed other than by processes which actually embed the fibrils within a more or less solid mass of the adhesive substance which immobilizes them as individual filaments and destroys the desired freedom of the individual filaments to flex virtually unimpeded in substantial sections of their length.

Hence further objects of the invention are to devise ways and means for progressively assembling and evenly blending a relatively sparse entanglement of relatively coarse, strong and heavy filaments with a relatively profuse entanglement of relatively slender, weak and light weight filaments.

A particular object is to form such dry assembly into a continuous traveling dry web of the loosely associated filaments prior to coating the latter with an agglutinant.

The above and related objects will appear more clearly from the following description of typical ways and means of obtaining the objectives referred to, which description has reference to the appended drawings wherein.

Figure 15:
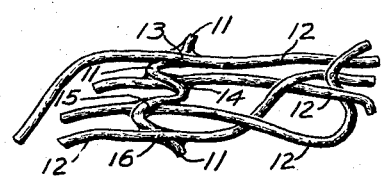
Fig. 15 shows the acute bending that is imposed on the coarse cross fiber of Fig. 13 when the material is squeezed in a vertical direction.
Figure 16:
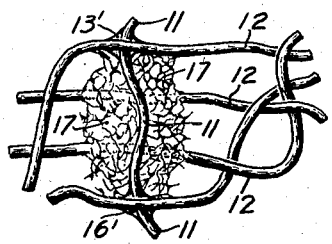
Fig. 16 is like Fig. 14 showing a reduction in the number of direct bonds between the horizontal coarse fibers and the vertical coarse fiber owing to the presence of an interposed fleece of fibrils or fine filaments.
Figure 17:
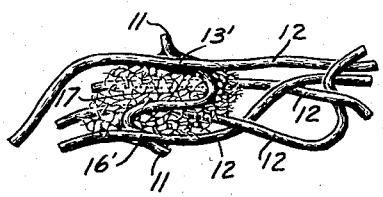

Fig. 17 corresponds with Fig. 15 but shows the relatively less acute bending imposed on the relatively unconstrained vertical fiber or coarse filament of Fig. 16 when subjected to vertical compression.

Figure 6:
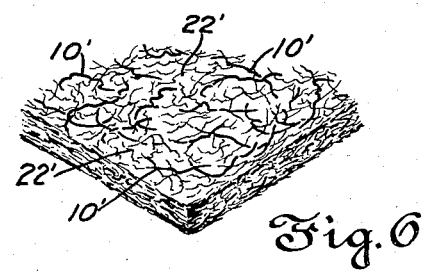
Fig. 6 is a view like Figs. 2 and 4 showing a body composed of the entanglement of mixed fibers and fibrils of contrasting sizes represented in Fig. 5 coated and bonded together.
Figure 7:
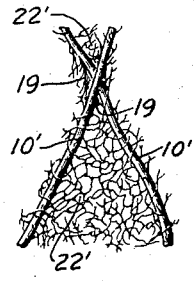
Fig. 7 is a greatly enlarged view of one particular relationship of coarse and fine filaments occurring in Fig. 6 wherein a fleece of the fine bonded textile fibrils forms a cushioning web or fillet in the crotch between two much coarser bonded together crossing fibers.
Figure 8:
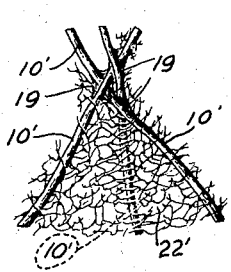
Fig. 8 shows a fleece of similar bonded fine fibrils forming a pyramidal cone permanently occupying a tapering pocket at the apex of the tent-like space between three coarse bonded-together intercrossed fibers.
Figure 9:
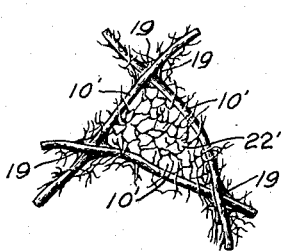
Figs. 9 and 10 show a fleece of similar bonded fine fibrils forming a cushioning diaphragm-like filler for a space encompassed by intercrossed coarse bonded fibers.
Figure 11:
Fig. 11 shows a compressible and stretchable network or fleece of fine bonded fibrils forming a web or fillet between juxtapositioned non-contacting coarse fibers that are not otherwise interconnected.
Figure 10:
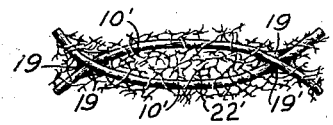
Figure 18:
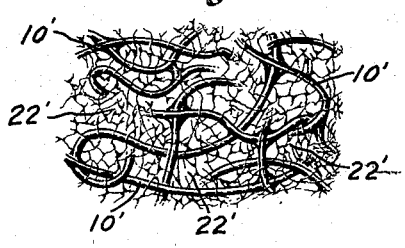

Fig. 18 shows on a scale larger than in Fig. 6, a fleece-like profusion of entangled bonded fibrils intermingled with a relatively sparse network of bonded fibers.

Figure 19:
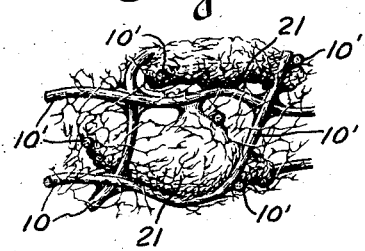

Fig. 19 shows some of the fibrils of Fig. 18 bunched partially into pills that are imprisoned by neighboring bonded filaments, which pills may or may not be saturated completely with the bonding substance.

My present discovery of new ways and means to produce a more economical and yet better performing and more enduring space filling material can be practiced with many variations both as to the method steps and materials employed, and is typified by the following examples of procedure and product which I have found to be successful in actual practice.

The coarse fibers and fine fibrils herein generically referred to as filaments can be natural or artificial. As examples of natural fibrils or very fine filaments of animal origin can be mentioned wool or silk. As examples of natural fibrils or very fine filaments of vegetable origin can be mentioned cotton, kapok, jute, or ramie, coming from the seeds, the bast, the leaf, or the fruit of plants. As examples of synthetic fibrils or very fine filaments can be mentioned viscose rayon, soybean or nylon which are representatives of cellulose, protein or resin fibers, respectively. The fibrils or fine filaments herein involved can also be inorganic, as asbestos, glass, metal.

The fibers or coarse filaments of the upholstery type may be of animal origin such as hog hair, cattle tail hair, horse mane hair, or may be of vegetable origin such as cactus fibers of the Tula or Peta variety, or may be synthetic such as nylon bristle. As a still more specific example, if viscose rayon staple constitutes the fibrils or fine textile filaments, a satisfactory size of same for some purposes may be 5.5 deniers of two inch to four inch staple length. In contrast to this the sizes of the fibers or coarse upholstery filaments might exceed 75 deniers. One denier is the cross section of a filament, of which a length of 9,000 meters weighs one gram. Most filaments (with the exception of inorganic materials, such as silicate glass fibers or metal wires) have densities between 1.1 (polyethylene) and 1.6 (polyvinylidene chloride). The majority of the technical fibers (cotton, rayon, silk, nylon, wool) have densities between 1.3 and 1.5. In these latter cases the diameter of a cylindrical filament having one denier cross section is 10.4 microns and 9.7 microns, respectively.

I first form a web or bat consisting of loosely entangled kapok, cotton or cellulose acetate fibrils or other weak filaments of correspondingly small or light cross section intermixed with more sparsely entangled fibers consisting of curled hog hair, curled cattle tail hair, or other strong filaments of correspondingly larger or heavier cross section having considerable stiffness or resilient strength. The proportions of each of the two contrasting sizes and strengths of filaments may vary. One suitable mixture would consist of fifty percent by weight of fibers or coarse filaments of upholstery size, comprised of three parts curled hog hair and one part curled cattle tail hair; along with fifty percent by weight of the fibrils or fine filaments of textile size which advantageously might consist entirely of viscose rayon staple approximating the size of same specified in the preceding paragraph.

I then cause to be sprayed downward against and through the bat a diluted (say 5%) dispersion of suitably compounded neoprene latex from a spray nozzle that traverses the bat at such speed as will insure all areas of the bat receiving substantially the same amount of sprayed latex. The volume and consistency of the latex comprising the spray is made such as merely to coat the fibrils and fibers without filling or badly clogging the spaces or voids therebetween whereby empty room is left in said spaces and voids sufficient to permit free individual flexing of the thinly coated fibers and fibrils therein in unbonded sections of their length.

During the spraying process the resilient strength of the upholstery fibers being sprayed sustains the textile fibrils being sprayed effectively against the compacting distortive force of the spray and at the same time the cushioning effect of the entangled textile fibrils bolsters the relatively skeletonized entanglement of upholstery fibers. The resultant stand-up strength of the fibril entanglement and the fiber entanglement combined therefore becomes greater than the mere sum of the individual respective strengths of these differently composed entanglements with respect to forces of compression.

After the coating of latex has been applied thus or in any equivalent manner capable of dispersing it throughout the texture of the bat, the sprayed bat is subjected to a zone of heat which may emanate from a bank of electric infra-red bulbs (not shown) containing incandescent filaments or the sprayed bat may be heated in or by a mold or otherwise to a sufficiently high temperature to dry or vulcanize the coating of latex or other adhesive coating substance. The fibers and/or fibrils where crossing one another or closely juxtapositioned are attached or bonded together by the coating which in the case of latex, whether vulcanized or merely dried, constitutes a flexible and resilient agglutinant thus forming a thin flexible resilient coating on individual filaments and further forming a flexible resilient bond usually in the form of a tiny fillet between juxtapositioned points on neighboring filaments.

My improved space filling material may be composed of one or any desired number of layers or bats such as that described. I have found one practical specification for the thickness of the dry bat before it is sprayed, to be a bat which weighs about one quarter ounce to a volume of bat measuring one square foot and having a thickness up to one half inch. Such bats after being sprayed may be compressed individually or in parallel laminated assemblage or in criss cross laminated assemblage while they are being heat treated thereby to bond adjacent bats together in surface to surface contact by means of the latex which coats the exposed filaments forming the perforate face of the intersticed material. I prefer to apply enough agglutinant by spray or otherwise to amount to between thirty per cent and fifty per cent of the total weight of the whole material.

Additional quantities of coating material may be applied to the already sprayed bat, for instance by dipping such bat in a bath of the coating solution. Added valuable properties may be imparted to the material by applying additional coatings of fire retarding and/or water repelling substances either separately or in combinations with the bonding substance.

Figure 1:
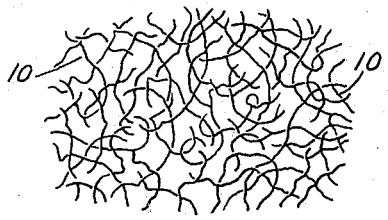
Fig. 1 is explanative and represents an open entanglement of loosely associated non-coated and non-adhering coarse filaments or upholstery fibers constituting a stereoreticulate assemblage or sliver of such fibers ready to be converted into an intersticed space filling material by known methods of coating and bonding the entangled filaments.
Figure 2:
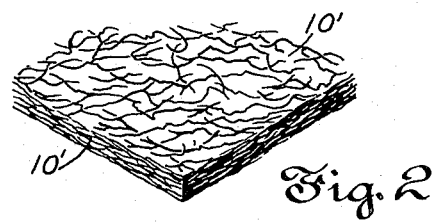
Fig. 2 is likewise explanative and shows the corner, the edges and a portion of the top surface of a coherent body of spaciously intersticed material resulting from coating and bonding together the entangled filaments represented in Fig. 1.
Figure 14:
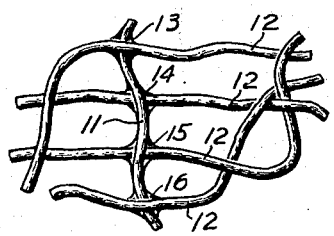
Fig. 14 is a diagrammatic representation of four generally parallel horizontal fibers or coarse filaments bonded to a single vertically extending cross fiber or coarse filament at four relatively close points along the length of the latter.

Referring now to certain principles of this invention as diagrammed in the drawings, Fig. 1 as heretofore explained represents a loosely entangled intersticed mass composed wholly of upholstery fibers, by which is meant a scarce and costly type of strong coarse filament such as curled animal hair which heretofore has been considered desirable as the sole ingredient of space filling resilient upholstery padding, while Fig. 2 represents a bat composed of the strong curled loosely entangled animal hair filaments 10' similar to those in Fig. 1 when bonded together by a coating of dried or vulcanized latex. Illustrative of serious disadvantages of the material of Fig. 2, in Fig. 14 on a greatly enlarged scale there is represented a more or less vertical cross fiber 11 assumed to be like fibers 10' in the bat of Fig. 2. This cross fiber 11 is bonded to parallel spaced fibers 12 at four near-together points 13, 14, 15, 16 along its length. When the material of Fig. 2 is compressed in a vertical direction the bonding of fiber 11 to fibers 12 at said four close points restricts the freedom of fiber 11 to bow freely and hence makes necessary acute angular bends in fiber 11 as shown in Fig. 15 that are very likely to exceed the elastic or fatigue limits of the fiber and thereby destroy its ability when released to reassume fully its original shape and sustaining action in the entanglement. My new discovery among other advantages remedies this condition by interposing a compressible and stretchable fleece of entangled fine textile fibrils as 17 between that portion of the length of fiber 11 which crosses the two midway fibers 12 and the said two midway fibers 12 as represented in Fig. 15. While the latex coating 18 may bond such fibrils to one another and to cross fiber 11 as well as to parallel fibers 12, the direct and spot impedance of the fiber-to-fiber bonds at 14 and 15 are eliminated. Thus an intervening stretchable compressible fleece or padding of flexible entangled bonded fine fibrils 17 becomes substituted for the former positive fixed bonding of fiber-to-fiber at 14 and 15 whereupon, when subjected to the same force as in Fig. 15, fiber 11 is now considerably relieved of constraining fixation or concentrated impedance at points 14 and 15 so that it is free for yielding to assume a less acute and less fatiguing bowed curvature as shown in Fig. 17.

Figure 12:
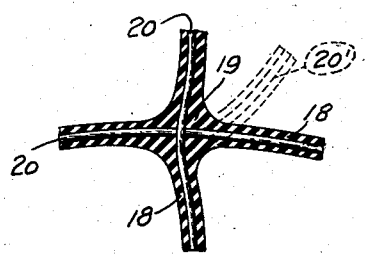
Fig. 12 shows on a still further enlarged scale and partially in cross-section a joint between two crossed coarse fibers attached together only by the fillet-forming bonding effect of an agglutinant that coats the fibers.
Figure 13:
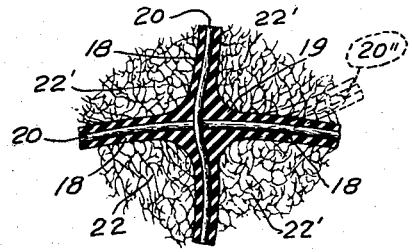
Fig. 13 shows the bonded together coarse fibers of Fig. 12 further reinforced by cushioning fleece-like fillets of fine bonded together fibrils.

Another way in which my newly proposed combination of intermixed entanglements of fibers or thick filaments and fibrils or thin filaments enables the latter to help sustain and protect the former from permanent deformation is illustrated in Figs. 12 and 13 wherein the dried and vulcanized coating substance 18 appears in cross section on a greatly enlarged scale forming a localized tiny bonding fillet 19 at the junction of two cross fibers. This localized or concentrated fillet of the bonding substance enables distortive stress caused by compression of the space filling material to deflect the fiber 20 to the sharply flexed broken line position 20'. But when the junction corner between these same fibers 20' in Fig. 13 is bolstered by a larger and more yielding fillet or web of the bonded entangled fibrils 17 as in Fig. 13, a similar distortive stress applied to fiber 20 as under the conditions in Fig. 13 will flex this fiber only as far as broken line position 20" in Fig. 13. This then is still another way in which the presence of the bonded fibrils 17 intermixed with the bonded fibers 10' or 20 prevents acute and permanent deformation of a mass space filling material so composed and produces a cushioning strength and resilient endurance of the material far greater than the mere additive strengths and resilient endurances of fibers alone plus the fibrils alone.

Figs. 7 to 10, inclusive, show various random relationships of the coated and bonded fibrils to the intermixed coated and bonded fibers, in each of which relationships the fiber bolstering function of the fibrils and the fibril sustaining function of the fibers is apparent from the foregoing explanation of the mutual physical reactions taking place therebetween.

Figure 5:
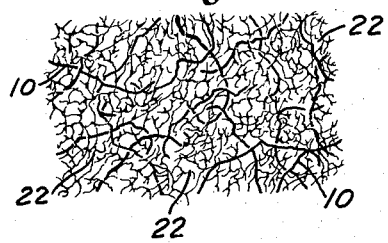
Fig. 5 shows a mixture of the same kind of fibers and fibrils as in Fig. 3 wherein balling up of the textile fibrils into pills or wads is obliterated by a more uniform and fleecy dispersion of the fibrils among the fibers throughout the material.

A representation of loosely entangled mixed fibrils 22 and fibers 10 in more nearly natural size appears in Fig. 5 which in comparison with Fig. 1 indicates the great saving of such expensive fibers as animal hairs that is made possible by the introduction of loosely entangled and cheaper fine textile fibrils as a substantial or major ingredient of the material. Fig. 6, in comparison with Fig. 2, represents a bat of the bonded fibers 10' and fibrils 22' of Fig. 5 and shows its contrast in appearance with the bat of bonded fibers 10' alone in Fig. 1.

Figure 3:
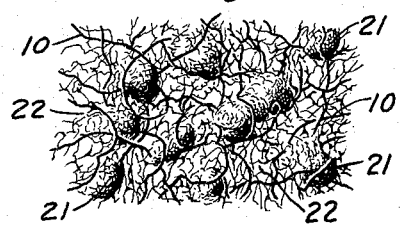
Fig. 3 shows the interstices in an entanglement of coarse filaments or upholstery fibers somewhat sparser than shown in Fig. 1 occupied by a fleece of entangled finer filaments or textile fibrils some of which are incompletely carded or relatively more closely balled up into pills.
Figure 4:
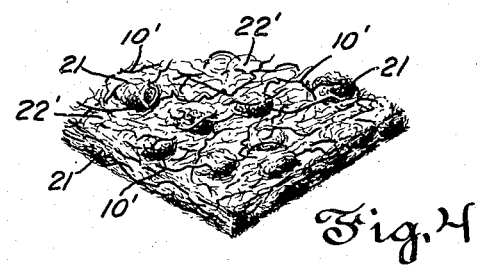
Fig. 4 is a view like Fig. 2 showing a body composed of the mixed fibers and fibrils of Fig. 3 bonded together.

If the thin filaments or fibril constituent of my improved space filling material are not thoroughly combed or carded while becoming loosely associated or entangled with the thick filament or fiber constituent of the material, then comparatively compacted though finely intersticed pills 21 of the fibrils may occur at spaced spots in the material as are represented in the loose entanglement of Fig. 3 and in the bonded bat composed of such entanglement as represented in Fig. 4. Because such incompletely carded pills of the fibrils may be so compact as to defeat complete saturation thereof by the sprayed coating and bonding substance, these pills may retain their natural, somewhat dry and unbonded interior thus increasing the absorbent capacity of the space filling material with respect to amounts of liquids which otherwise could leak therethrough. This will reduce the extent of such leakage.

The bonded imprisonment or retention of pills 21, composed of incompletely carded fibrils 17, in positional relation to fibers 10' is indicated on an enlarged scale in Fig. 18. Fig. 17 on a similarly enlarged scale shows that certain groups of fibrils 17, even when more uniformly disseminated throughout the material, are similarly stayed or fixed in constant proximity to always the same sustaining fibers 10'. In either case particular fibrils are prevented by the bonding from vagrant shifting or sifting in relation to particular fibers throughout the material and are thereby prevented from bunching up or packing together in localized areas of the entanglement as would otherwise result from repeated compression or vibration of an unbonded material so composed.

I have found that the tendency of the fibrils to form into pills is more pronounced when the staple length of the fibril is comparatively short. Thus a rayon staple of one inch lengths will tend to pilling much more than an otherwise like staple of four inch or five inch lengths.

Where the resulting space filling material is desired to be stiff or merely a bit flexible instead of resiliently compressible or stretchable there may be used as the bonding substance of these improvements an emulsion of thermo-setting resin such as Bakelite. Rubber latex as referred to herein represents a substance having the pertinent characteristics of rubber deposited from a dispersion.

This and other substitutes for the particular ingredients of my improved space filling material herein named will occur to those skilled in the art and all such are contemplated and intended to be covered which come fairly within the terminology of the appended claims.

This application is a continuation in part of my copending application, Serial No. 491,407, filed June 8, 1943, and now abandoned.

I claim:

1. A resilient compressible bulk material of stereoreticulate open filamentary structure comprising an unwoven unfelted skeleton framework of relatively strong resilient fibers individually heavier in cross section than 74 deniers mutually entangled in a manner to leave spaces therebetween of sufficient size to permit said fibers to flex within said spaces, and an unwoven unfelted fleece of relatively weak fibrils individually more flexible than said fibers individually lighter in cross section than 41 deniers mutually entangled in a manner to leave voids therebetween more minute than said spaces but of sufficient size to permit said fibrils to flex within said voids, portions of said fleece occupying said spaces and forming a compressible and stretchable padding imprisoned and interspersed at least in part between said fibers and penetrated thereby, and a resilient agglutinant substance thinly coating and bonding to one another at spaced points said fibers and coating and bonding to one another at spaced points said fibrils and bonding to one another at spaced points at least some of said fibers and some of said fibrils, said coating being sufficiently sparse to leave empty room in said spaces and voids sufficient to permit free individual flexing of said thinly coated fibers and fibrils therein in unbonded sections of their length.

2. A resilient compressible bulk material as defined in claim 1, in which the said agglutinant substance comprises a substance having substantially the resilient deformability of soft rubber.

3. A resilient compressible bulk material as defined in claim 1, in which the weight of the said agglutinant substance constitutes between thirty and fifty per cent of the overall weight of the said material.

4. A resilient compressible bulk material of stereoreticulate open filamentary structure comprising an unwoven unfelted skeleton framework of relatively strong resilient fibers of individual thickness within a range of upholstery sizes mutually entangled in a manner to leave spaces therebetween of sufficient size to permit said fibers to flex within said spaces, and an unwoven unfelted fleece of relatively weak fibrils individually more flexible than said fibers of thinness within a range of textile sizes mutually entangled in a manner to leave voids therebetween more minute than said spaces but of sufficient size to permit said fibrils to flex within said voids, portions of said fleece occupying said spaces and forming a compressible and stretchable padding interspersed at least in part between said fibers and penetrated thereby, and a resilient agglutinant substance thinly coating and bonding to one another at spaced points said fibers and bonding to one another at spaced points said fibrils and bonding to one another at spaced points at least some of said fibers and some of said fibrils, said coating being sufficiently sparse to leave empty room in said spaces and voids sufficient to permit free individual flexing of said thinly coated fibers and fibrils therein in unbonded sections of their length.

5. A resilient compressible bulk material as defined in claim 4, in which the said compressible and stretchable padding portions of the said fleece of fibrils are arranged to separate the said fibers in a manner to reduce the number of direct fiber-to-fiber bonds afforded by the said agglutinant substance thereby relieving said fibers of fatiguing flexure at angles of acute degree when said material is compressed.

6. A resilient compressible bulk material as defined in claim 4, in which there recurs as a characteristic of its said structure a continuous length of some single fiber crossed by and bonded to a plurality of others of said fibers in the said framework by the said agglutinant substance at two spaced points, said single fiber also being crossed at a point intermediate said two spaced points by a different one of said fibers in the said framework free from direct bonding by said agglutinant substance to said single fiber, said single fiber being flexibly joined to said different fiber by only a compressible and stretchable portion of the said fleece some of whose said fibrils are bonded to said single fiber and others of whose said fibrils are bonded to said different fiber.

7. A resilient compressible bulk material as defined in claim 4, in which the said fleece includes neps formed by incompletely combed groups of the said fibers more closely bunched than elsewhere in said fleece.

8. A resilient compressible bulk material of stereoreticulate open filamentary structure comprising an unwoven unfelted skeleton framework of relatively strong resilient fibers individually heavier in cross section than 74 deniers mutually entangled in a manner to leave spaces therebetween of sufficient size to permit said fibers to flex within said spaces, and an unwoven unfelted fleece of relatively weak fibrils individually more flexible than said fibers individually lighter in cross section than 41 deniers mutually entangled in a manner to leave voids therebetween more minute than said spaces but of sufficient size to permit said fibrils to flex within said voids, portions of said fleece occupying said spaces and forming a compressible and stretchable padding imprisoned and interspersed at least in part between said fibers and penetrated thereby, and a resilient agglutinant substance thinly coating and bonding to one another at spaced points said fibers and coating and bonding to one another at spaced points said fibrils and bonding to one another at spaced points at least some of said fibers and some of said fibrils, said coating being sufficiently sparse to leave empty room in said spaces and voids sufficient to permit free individual flexing of said thinly coated fibers and fibrils therein in unbonded sections of their length, the combined weight of all the said textile fibrils constituting the said fleece approximating the combined weight of all the said upholstery fibers constituting the said framework.

9. A resilient compressible bulk material of stereoreticulate open filamentary structure comprising an unwoven unfelted skeleton framework of relatively strong resilient fibers individually heavier in cross section than 74 deniers mutually entangled in a manner to leave spaces therebetween of sufficient size to permit said fibers to flex within said spaces, and an unwoven unfelted fleece of relatively weak fibrils individually more flexible than said fibers individually lighter in cross section than 41 deniers mutually entangled in a manner to leave voids therebetween more minute than said spaces but of sufficient size to permit said fibrils to flex within said voids, portions of said fleece occupying said spaces and forming a compressible and stretchable padding imprisoned and interspersed at least in part between said fibers and penetrated thereby, and a resilient agglutinant substance thinly coating and bonding to one another at spaced points said fibers and coating and bonding to one another at spaced points said fibrils and bonding to one another at spaced points at least some of said fibers and some of said fibrils, said coating being sufficiently sparse to leave empty room in said spaces and voids sufficient to permit free individual flexing of said thinly coated fibers and fibrils therein in unbonded sections of their length, the combined weight of all the said textile fibrils constituting the said fleece approximating the combined weight of all the said upholstery fibers constituting the said framework, and the weight of the said agglutinant substance constituting between thirty and fifty per cent of the overall weight of the said material.

10. A resilient compressible bulk material of stereoreticulate open filamentary structure comprising an unwoven unfelted skeleton framework of relatively strong resilient fibers comprising curled animal hair individually heavier in cross section than 74 deniers mutually entangled in a manner to leave spaces therebetween of sufficient size to permit said fibers to flex within said spaces, and an unwoven unfelted fleece of relatively weak fibrils comprising viscose rayon staple individually more flexible than said fibers individually lighter in cross section than 41 deniers mutually entangled in a manner to leave voids therebetween more minute than said spaces but of sufficient size to permit said fibrils to flex within said voids, portions of said fleece occupying said spaces and forming a compressible and stretchable padding imprisoned and interspersed at least in part between said fibers and penetrated thereby, and a resilient agglutinant substance thinly coating and bonding to one another at spaced points said fibers and coating and bonding to one another at spaced points said fibrils and bonding to one another at spaced points at least some of said fibers and some of said fibrils, said coating being sufficiently sparse to leave empty room in said spaces and voids sufficient to permit free individual flexing of said thinly coated fibers and fibrils therein in unbonded sections of their length.

ANSELM TALALAY.

REFERENCES CITED

The following references are of record in the file of this patent:

UNITED STATES PATENTS

| Number | Name | Date |
|---|---|---|
| Re. 20,271 | Nieley | Feb. 16, 1937 |
| 256,603 | Smith et al. | Apr. 18, 1882 |
| 852,474 | Tyden | May 7, 1907 |
| 1,368,921 | Gallagher | Feb. 15, 1921 |
| 1,567,841 | Curtin | Dec. 29, 1925 |
| 1,955,892 | Schur | Apr. 24, 1934 |
| 2,023,273 | Leguillon | Dec. 3, 1935 |
| 2,140,063 | Talalay | Dec. 13, 1938 |
| 2,194,036 | Talalay | Mar. 19, 1940 |
| 2,198,232 | Shopmeck | Apr. 23, 1940 |
| 2,251,252 | Lovell | July 29, 1941 |
| 2,288,095 | Lindsay et al. | June 30, 1942 |
| 2,330,314 | Schwartz | Sept. 28, 1943 |
| 2,370,365 | Magill | Feb. 27, 1945 |